US008266259B2

(12) United States Patent
Vellanki et al.

(10) Patent No.: US 8,266,259 B2
(45) Date of Patent: Sep. 11, 2012

(54) MANAGING USER CUSTOMIZATIONS OF PRE-PROVISIONED CONTEXTS

(75) Inventors: Vivekanand Vellanki, Hyderabad (IN); Hong Liu, Sammamish, WA (US); R. Malayala Srinivasan, Hyderabad (IN); Aseem Chauhan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1514 days.

(21) Appl. No.: 11/599,054

(22) Filed: Nov. 14, 2006

(65) Prior Publication Data
US 2008/0114814 A1 May 15, 2008

(51) Int. Cl.
*G06F 15/177* (2006.01)
(52) U.S. Cl. ........ 709/221; 370/252; 370/254; 709/220; 709/222; 709/250; 713/1; 713/100
(58) Field of Classification Search ................ 713/1
See application file for complete search history.

(56) References Cited

U.S. PATENT DOCUMENTS

| | | |
|---|---|---|
| 6,907,265 B1 | 6/2005 | Holmstrom et al. |
| 6,920,116 B1 | 7/2005 | Hossain et al. |
| 6,934,302 B2 | 8/2005 | Gammenthaler, Jr. |
| 6,976,171 B1 | 12/2005 | Ritter et al. |
| 6,985,968 B1 | 1/2006 | Gammenthaler, Jr. |
| 7,023,994 B1 | 4/2006 | Dupre |
| 2003/0061495 A1* | 3/2003 | Minnick ........................ 713/189 |
| 2003/0073438 A1* | 4/2003 | Fukushima et al. .......... 455/432 |
| 2003/0221094 A1* | 11/2003 | Pennarun ........................ 713/1 |
| 2005/0141438 A1* | 6/2005 | Quetglas et al. .............. 370/254 |
| 2006/0200363 A1* | 9/2006 | Tsai ................................ 705/1 |
| 2010/0074239 A1* | 3/2010 | Born ............................. 370/338 |

OTHER PUBLICATIONS

T-Mobile Privacy Notice, downloaded from http://www.selfcare.hotspot.t-mobile.com/corporate_privacy.do, downloaded on Aug. 21, 2006, pp. 1-5.
Bellavista, et al., "Mobile Agent Middleware for Mobile Computing," downloaded from http://www.sics.se/~sameh/research/MobileComputing/Mobile%20Agent%20Middleware%20for%20Mobile%20Computing/r3073.pdf; dated Mar. 2001, pp. 73-81.
Gardner, et al., "Mobile Web Sessions for Mobile Computing," downloaded from http://www.essex.ac.uk/chimera/content/pubs/pubs/www2004-MRG0AS_final.pdf, dated May 17-22, 2004, (7 pages).
Thanh, Do Van, "Introduction to Mobility," downloaded from http://www.item.ntnu.no/fag/tm8100/Pensumstoff2004/MOBILIThan.ppt; dated Sep. 19, 2001, pp. 1-31.

* cited by examiner

*Primary Examiner* — Charles Appiah
*Assistant Examiner* — Mazda Sabouri

(57) ABSTRACT

A method, system, and computer-readable medium for seamlessly updating connection parameters that allow a communications device of a host machine to connect to a Wireless Wide Area Network. Users are allowed to edit certain parameters, and these changes are stored in persistent storage along with a unique identifier for the set that was edited. At connection time, the user's edits override the defaults pre-provisioned by the network operator and stored on the device. The operator can also remotely edit the parameters, after which the user's changes are overwritten with the new defaults. Thus, the invention is capable of seamlessly handling updates to the connection parameters by both the user and the network operator.

20 Claims, 4 Drawing Sheets

MANAGING USER CUSTOMIZATIONS OF PRE-PROVISIONED CONTEXTS

FIELD OF THE INVENTION

The present invention relates to methods and apparatus for connecting a host machine to a communications network.

BACKGROUND OF THE INVENTION

Cellular communications networks have become nearly ubiquitous in many areas of the world; the number of areas they do not yet reach is ever-dwindling. With the advent of digital communications technology, the number of devices that could reliably use the service provided by these networks rose immeasurably, and as more and more people have begun using such devices, demand for reliable Wireless Wide Area Networks for digital communication has grown by leaps and bounds.

Connection to these networks is simple, enabled by a small set of connection parameters and a communications device equipped with an appropriately-configured transceiver, just as with local wireless networks. A host machine, such as a laptop computer, personal digital assistant, or other mobile device, sends the connection parameters to the device, which transmits data based on those instructions.

Storing all such parameters on the host machine and passing them to the communications device at connection time is common practice in most communications networks. In some networks such as WWANs, however, such practice is less favorable. Since the range of a WWAN is wider than these similar networks, there are more devices connecting to it and therefore more opportunity for problems to arise and a higher probability that they will. The network operators, then, require greater control over the devices that connect to their network to ensure maximum reliability and security.

SUMMARY OF THE INVENTION

One solution could be to simply store all of the connection parameters in the device. This, however, is not ideal because some of the parameters, such as username and password, should be editable by the user. Storing some parameters on the device, to be edited by the operator and protected from piracy, and some parameters on the host machine, to be edited by the user, is therefore the only solution. This is not a trivial problem, as the two sets of parameters must be editable by the user and the network operator and must be kept in sync with one another.

Therefore, there is need for a method of storing the connection parameters that allows for updating of parameters while maintaining a synchronized set of parameters on both the host machine and the communications device.

The proposed solution is to copy each set of connection parameters from the communications device to volatile memory allocated to the device driver on the host machine, and associate with each a unique identifier that the device driver has calculated. When a user edits the parameters, the changes are stored in persistent storage along with the unique identifier for that set of parameters. These changes can then be passed to the device driver at connection time. When a network operator edits the parameters on the device, the changes are copied over to volatile memory to overwrite the previous parameters and a new identifier is calculated. The new data and the identifier are then provided to the user-edited parameters in persistent storage, which are updated or deleted accordingly.

One illustrative embodiment is directed to a method for seamlessly updating connection parameters that allow a host machine comprising a communications device to connect to a communications network. The method comprises copying a subset of the connection parameters from the communications device to the host machine and calculating a unique identifier for the connection parameters. A first subset of the connection parameters and the unique identifier are stored and associated with one another in volatile memory on the host machine, while a second subset of the first subset and the unique identifier are stored and associated with one another in persistent storage on the host machine. The second subset comprises changes made to the first subset by a user of the host machine. When an operator of the communications networks replaces the connection parameters stored on the communications device with new connection parameters, the contents of the first and second subsets and the unique identifier are overwritten with the new connection parameters and a new unique identifier calculated for the new connection parameters.

Another illustrative embodiment is directed to a system for seamlessly updating connection parameters. The system comprises a host machine and a communications device operable to communicate with the host machine and capable of connecting to a communication network. A device driver that enables communication between the host machine and the communication device as well as calculates a unique identifier for the connection parameters and passes it to the host machine and the communications device is also included in this embodiment. The systems further comprises volatile storage means on the host machine for storing a first subset of the connection parameters and the unique identifier in association with one another and persistent storage means on the host machine for storing a second subset of the connection parameters and the unique identifier in association with one another. Lastly, a software module on the host machine that initializes an attempt to connect to the communications network is included.

A further illustrative embodiment is directed to a computer-readable medium comprising computer-readable code instructions configured to cause a computer comprising a communications device to execute the steps of copying a subset of the connection parameters from the communications device to the computer; calculating a unique identifier for the connection parameters; storing and associating with one another in volatile memory on the computer a first subset of the connection parameters and the unique identifier; storing and associating with one another in persistent storage on the computer a second subset of the first subset and the unique identifier, said second subset comprising changes made to the first subset by a user of the host machine; and, when an operator of the communications networks replaces the connection parameters stored on the communications device with new connection parameters, overwriting the contents of the first and second subsets and the unique identifier with the new connection parameters and a new unique identifier calculated for the new connection parameters.

BRIEF DESCRIPTION OF THE DRAWINGS

In the drawings.

3A showing the possible steps when the user has edited some of the connection parameters, and FIG. 3B depicting the possible steps when the communications device has refused to share some of its data.

DESCRIPTION OF THE PREFERRED EMBODIMENTS

Figure 1:
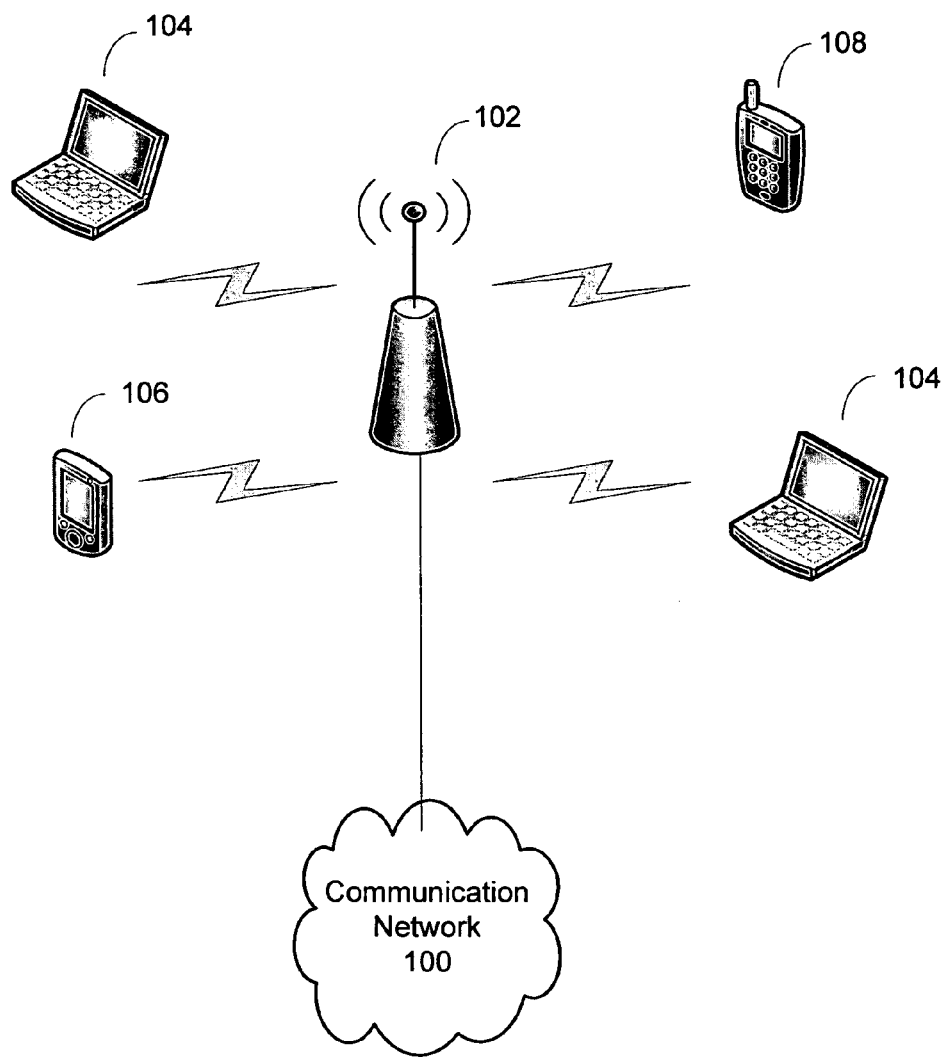
FIG. 1 is a diagram of an environment in which this invention may act.

Aspects of the present invention relate to improved techniques for seamlessly updating connection parameters that allow a host machine comprising a communications device to connect to a communications network.

An example of a network environment in which embodiments of the invention may be implemented will now be described with reference to FIG. 1. The example network includes several mobile computing devices acting as host machines under the present invention, such as laptops 104, personal digital assistant 106, and smart phone 108. Each of these is in a state of, or capable of being in a state of, wireless communication with wireless access point 102 connected to communication network 100. In some embodiments, the communication network 100 will comprise many other access points to form a Wireless Wide Area Network (WWAN). This WWAN may, in some embodiments, comprise a Global System for Mobile communications system coupled with General Packet Radio Service protocols. In other embodiments, the WWAN may comprise a Code Division Multiple Access protocol. Still other embodiments will operate on other network types, however, and it should therefore be understood that the invention is not limited in any way to being practiced with the GSM/GPRS protocol combination or with CDMA. Each mobile computing device comprises a communication device capable of exchanging data with access point 102. In some host machines, such as smart phone 108, the communication device may be an integral part of the machine while in others, such as laptops 104, the communication device may be a removable peripheral communicating with the host machine via the PCMCIA, PCI, or USB standards.

It should be noted, however, that FIG. 1 is only an example of an environment; the invention is not limited to what is depicted therein. The host machines of the present invention are not limited to the mobile computing devices shown in FIG. 1. Indeed, the host machine of the present invention need not be mobile to operate within the bounds of the invention.

Figure 2:
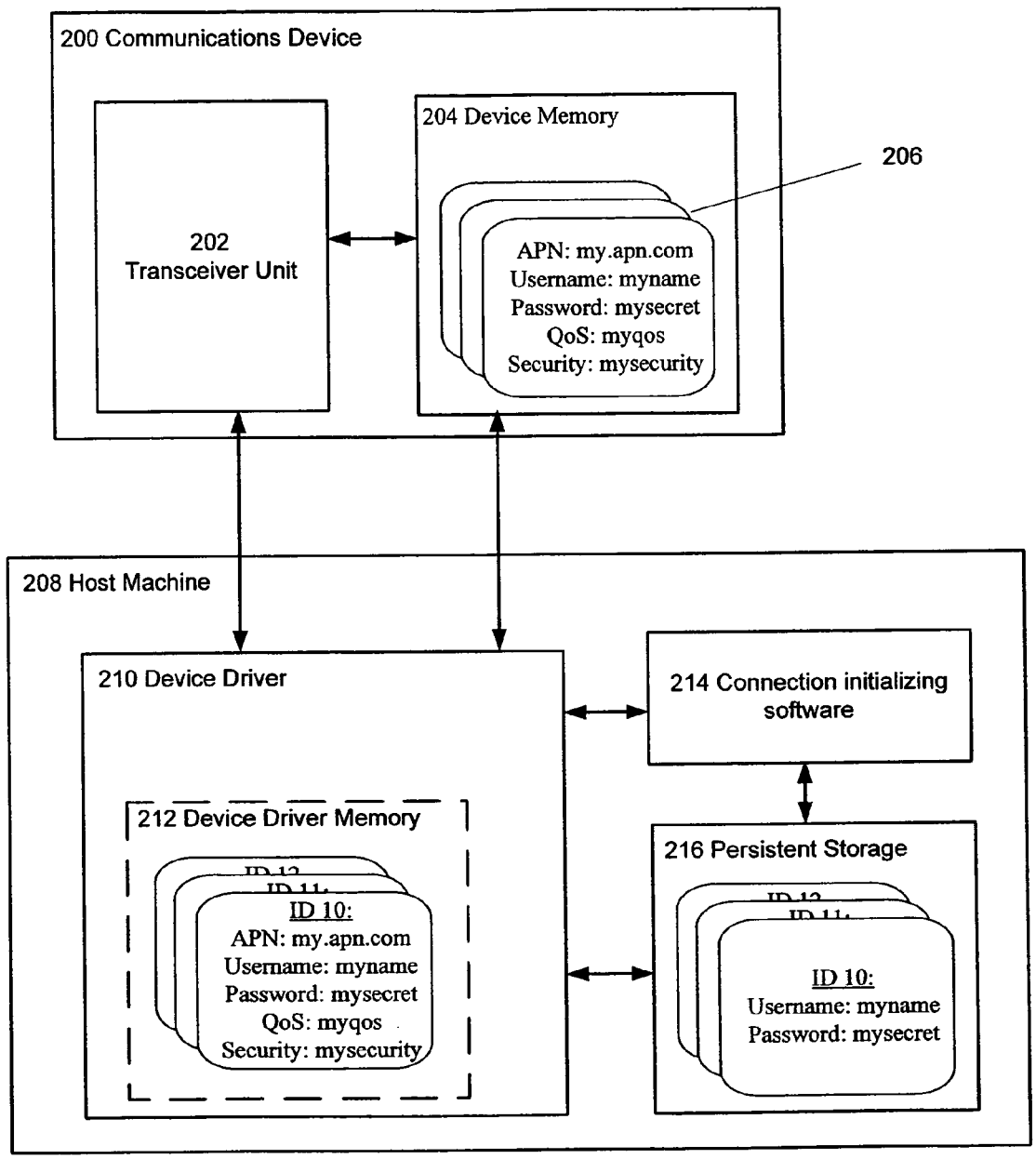
FIG. 2 is a block diagram of the components of one embodiment of the system.

FIG. 2 is a block diagram that shows the components of the system of an embodiment of the invention. A communications device 200 is shown, comprising a transceiver 202, which transmits information to and receives information from the access point 102, as well as device memory 204. As described above, device memory 204 contains one or more sets of connection parameters 206 that have been pre-provisioned by the network operator and the device manufacturer. These stored sets of parameters 206, termed pre-provisioned contexts, allow the host machine 208 to connect to the access point 102 in several different ways based on different demands of the connection. Each context may, therefore, have different connection parameters.

Examples of context types include typical Internet data service, multimedia service, or VPN service. Each of these puts different demands on the connection. Multimedia service may require that the packets be delivered quickly, reliably, and in correct order to ensure proper playback, while typical data service may require that the packets merely be delivered reliably. Likewise, Virtual Private Network service may require a different access point that is more secure than others in the network, and may also require more transmission security of the connection than typical data service.

The connection parameters stored in the contexts may vary based on the type of communication network being connected to and the demands placed on it by its users and operators. An example list of parameters 206 is shown, however, that may be typical in some embodiments. This list shows the name of the access point to which the device will connect, the username and password to use for connection authentication, the quality of service settings governing packet flow and other aspects of transmission and receipt, and security settings. In other embodiments, there may be greater or fewer parameters in each context.

FIG. 2 also depicts a block diagram of host machine 208, comprising a device driver 210, system memory 212, and connection initializing software 214. According to an embodiment of the present invention, when communication device 200 is connected to the host machine, the device driver 210 pulls the contexts stored in device memory 204 over to volatile memory allocated to the device driver, herein referred to as device driver memory 212. Device driver 210 then uses the contents of each context to computer a unique identifier, termed a Context ID, for each context. In one embodiment of the invention, this Context ID may be calculated as an MD5 hash of the context's connection parameters. (The method of performing an MD5 hash is well-known in the art and will therefore not be discussed herein.) It should be understood, however, that any type of calculation may be used for the Context ID, as the aspects of the invention described herein are not limited to the use of any particular type of function.

Another embodiment of the current invention allows for the communication device 200 to keep some of the connection parameters secret by not letting the device driver 210 pull them into device driver memory 212. This is useful in situations where a network operator would not want to compromise some parameters such as security methods. In this case, the device driver would copy the public elements of each context, calculate the unique identifier, and store with those a reference to the private parameters on the communication device 200. Thus, when the device driver 210 requires the private parameters for a task, it can retrieve them, but does not store them long-term in its associated memory. Thus, the risk of these private parameters being compromised is minimized.

Persistent storage 216 is also shown in FIG. 2. In contrast to the device driver memory 212, the contents of this store are maintained long term. If, to use the laptop and PCMCIA card example, the PCMCIA card were to be removed from the laptop or the laptop be shut down, the contents of device driver memory 212 would be lost and would have to be recreated from the device memory 204, while the information in persistent storage 216 would remain intact. In this way, when the device driver 210 re-copies the contexts and recalculates the Context ID, the user's edits that are associated with that Context ID can still override the defaults at connection time.

In an embodiment of the invention, the information stored in persistent storage 216 is minimal. According to the embodiment, only parameters that have been changed from those stored in the device driver memory 212 are stored. For example, if a user has opted to use a different username and password combination than is stored in the device memory 204 to connect with a certain context, persistent storage 216 will store the ID of that context along with the changed username and password.

Lastly, FIG. 2 shows connection initializing software 214. This is the software module that, in some embodiments, tells device driver 210 what context to connect using and supplies any necessary alterations to the parameters from persistent storage 216. These alterations, as described above, could include a different username or password, or any parameter stored in a user-editable location and fashion.

Figure 3A:
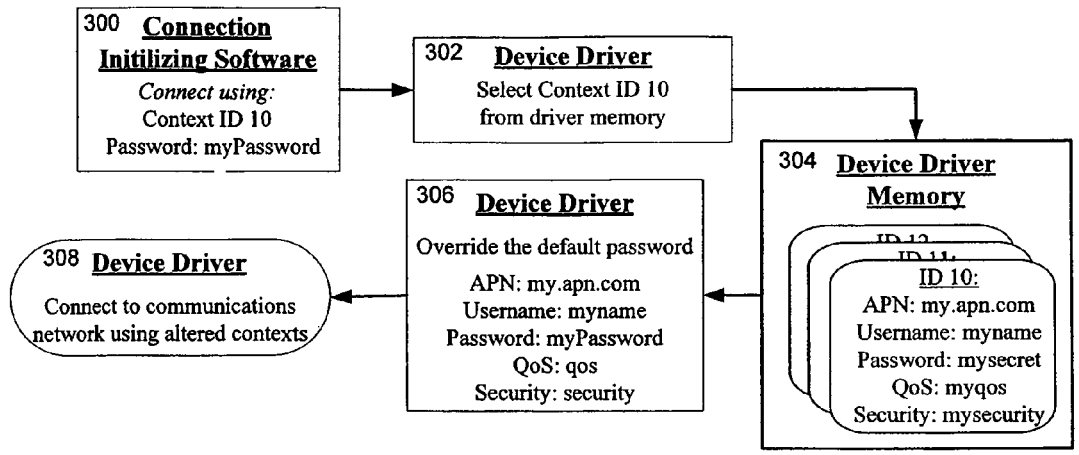
FIGS. 3A and 3B are two flowcharts showing the connection process through which the system may step, with FIG.
Figure 3B:
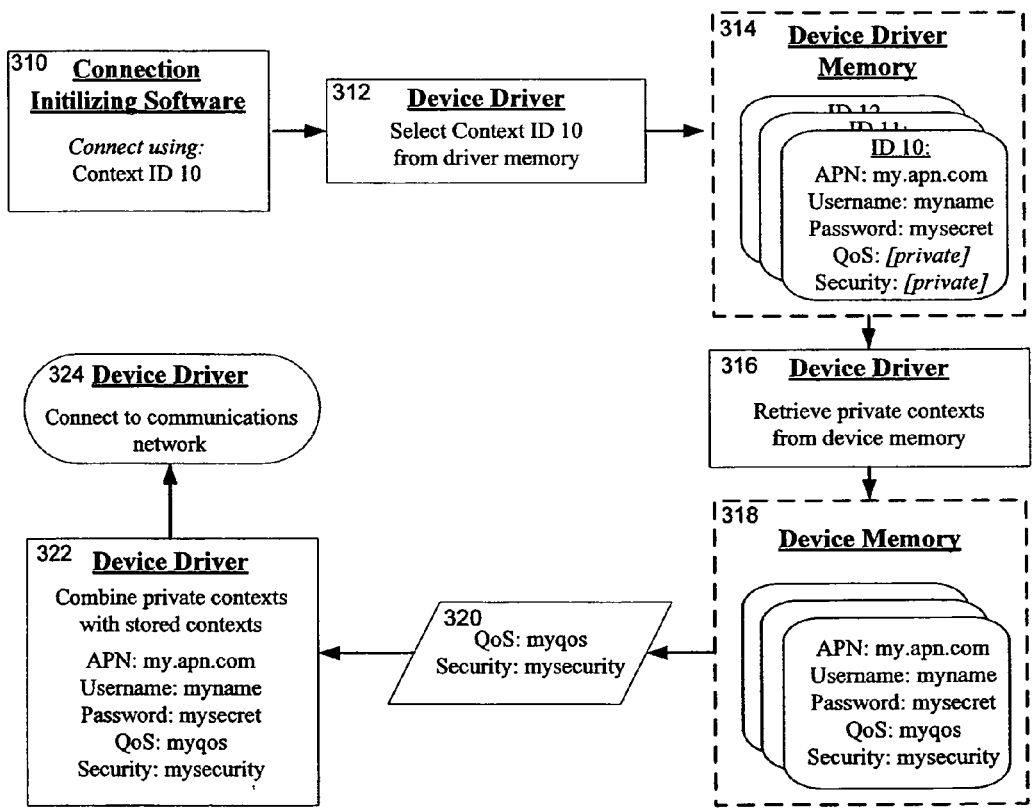

Before discussing FIGS. 3A and 3B, wherein two flowcharts are provided, it must be emphasized that these flowcharts are not meant to be definitive. By no means are the steps shown in these flowcharts exclusive. Further, many steps are shown in response of the specific example data and may not be executed in all embodiments or situations. Other connection situations may use more or less steps than currently illustrated. Thus, the invention is not limited or defined by the steps shown in any of the two flowcharts depicted in FIGS. 3A and 3B.

FIG. 3A shows the steps that may be executed, according to an embodiment of the invention, when connecting to the communication network 100, specifically when persistent storage 216 does contain edited parameters and when the device driver memory 212 contains all of the parameters stored in the device memory 204. First, connection initializing software 214 tells the device driver 210 that it wants to connect using Context ID 10 but with a different password than the one provided by the communication device 200. The device driver 210 then consults its allocated memory 212 ("device driver memory") to find the data associated with Context ID 10. It then merges the stored data with the data it has been passed after which it attempts to connect to communication network 100 through access point 102. This merge is conducted by replacing any stored parameters in the context with those supplied by the connection initializing software 216. When merging the two sets of data, it is important to note, the original data stored in device driver memory 212 after being copied from device memory 204 is not overwritten. The combination is made in separate memory to ensure that the original data remains intact.

Connecting to a network given parameters such as these is known in the art, and it is not discussed here with the assumption that one of ordinary skill in the art will understand this practice.

FIG. 3B shows the steps that may be executed, according to an embodiment of the invention, when connecting to the communication network 100, specifically when persistent storage 216 does not contain any edited parameters and when the communication device 200 has kept some parameters private. The steps are similar to those of FIG. 3A discussed above, except that the device driver 210 must communicate with the communication device 200 in order to retrieve the parameters that have been deemed private. As discussed above, in some embodiments of the invention, the communications device 200 can prevent the device driver 210 from copying the entirety of a context over to the device driver memory 212. In this case, device driver memory 212 would contain references to memory locations in the device memory 204 where the necessary information could be copied from. These references enable the device driver 210 to gather information it needs, but prevent that information from being stored long-term in a way that could compromise it. Just as in the previous example of 3A, the information retrieved from the communication device 204 is merged with the information stored in the referenced context in device driver memory 212. Since there were no user-edited parameters passed to the device driver 210 by the connection initializing software 216, the device driver 210 is now free to make a connection attempt and pass the merged set to the communication device 200. The private data is then removed from the system as soon as it is no longer necessary for communication.

Figure 4:
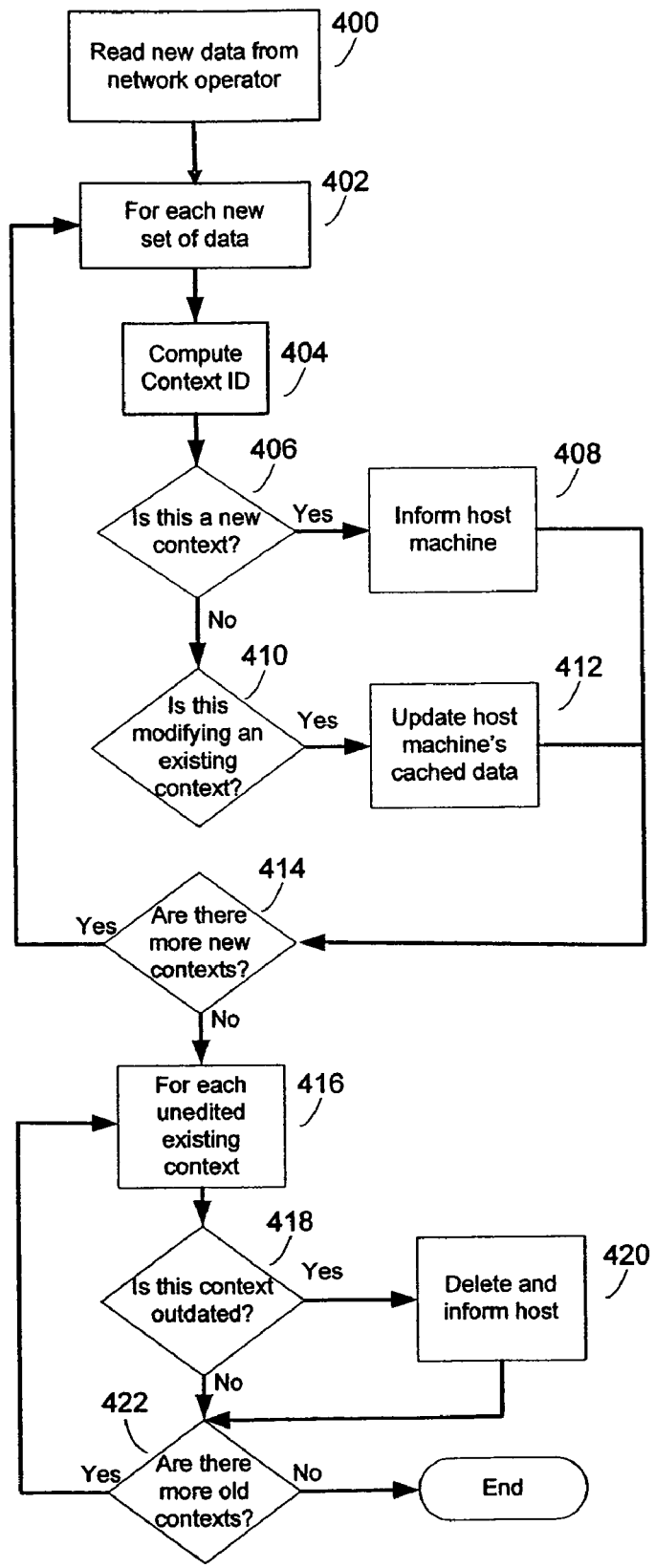
FIG. 4 is a flowchart showing the steps that may be executed when a network operator has changed some of the connection parameters or added new sets of parameters.

FIG. 4 shows the steps that may be executed, according to an embodiment of the invention, when an operator of the communications network has transmitted changes to the contexts stored in the device memory 204 to the communication device 200 from the access point 212. Just as with FIG. 3, this chart is not intended as a definitive depiction of the invention and should not be considered to be limiting. The changes sent by the operator could be alterations to specific parameters in each context, such as updates to the security protocols, or an entirely new context. A further change could be the deletion of a context. These changes can be transmitted from the operator to the device in a variety of ways. In one embodiment of the invention, the changes are made using the Short Message Service protocol, which is well known in the art of cellular communications and will not be discussed here. Other embodiments will allow the operator to update the data stored on the device in different ways. It should therefore be understood that the invention is not limited in any way to being practiced with the SMS protocol.

For each new piece of data, the device driver 210 calculates a Context ID for either the edited or new context. If it is a new context, it informs the rest of the host machine that the new context is available by placing the ID in persistent storage 216. If it is modifying an old context, the record in the persistent storage 216 associated with the old Context ID is updated with the new Context ID and any changes that are stored are changed as well. As an example of the latter, if a user has specified that Context 10 will connected with a different access point name than the one originally specified on communication device 200, and the operator updates the communication device 200's copy of what is known on the host machine as Context 10 with a new access point name, then the new Context ID is written over the old Context ID and the record of the new APN deleted. If the user still wishes to connect with their chosen APN, they will need to re-enter that data after an update. The same is true of any user-customizable data, such as username and password.

After all of the new context data have been processed, the data stored in the persistent storage 216 is examined to see if it is out-of-date following the changes. If, for example, a context is removed from the device memory 204, then the corresponding context in the persistent storage 216 would be deleted as well. In this way, the data stored in persistent storage 216 is kept small and efficient.

It should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," or "having," "containing," "involving," and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for updating connection parameters that allow a host machine comprising a communications device to connect to a communications network, the method comprising:
    copying a first subset of the connection parameters from the communications device to the host machine;
    calculating a unique identifier for the first subset;
    storing and associating with one another in volatile memory on the host machine the first subset of the connection parameters and the unique identifier;
    storing and associating with one another in persistent storage on the host machine a second subset of connection parameters and the unique identifier for the first subset of connection parameters, said second subset comprising at least one changed parameter created from changes made to at least one original parameter of the first subset by a user of the host machine;
    when an operator of the communications network updates the connection parameters stored on the communications device with new connection parameters:
    calculating a new unique identifier for the new connection parameters;
    when at least one new parameter corresponds to the at least one original parameter of the first subset, overwriting in the persistent storage the at least one changed parameter of the second subset that corresponds to the at least one original parameter, and
    associating the second subset with the new unique identifier in the persistent storage, wherein storage of the new connection parameters is determined according whether the new connection parameters are public, where new connection parameters determined to be public are stored in the persistent storage, and where new connection parameters not determined to be public are not stored in the persistent storage.

2. The method of claim 1, wherein the first subset of the connection parameters comprises an Access Point Name, username, and password.

3. The method of claim 2, wherein the first subset of the connection parameters further comprises quality of service and security settings.

4. The method of claim 2, wherein the first subset of the connection parameters further comprises references to memory locations on the communications device from which quality of service and security settings can be retrieved.

5. The method of claim 1, wherein the unique identifier comprises an MD5 hash of the connection parameters.

6. The method of claim 1, wherein the communications network is a Global System for Mobile Communication network implementing a General Packet Radio Service protocol.

7. The method of claim 1, further comprising:
    receiving a request to connect to the communications network, the request comprising the second subset and the unique identifier for the first subset; and
    attempting, with the device driver, to connect to the communications network, the attempting comprising:
    when the second subset is empty, passing the unique identifier associated with the second subset to a device driver, the device driver using the first subset that is associated with the unique identifier to connect to the communications network using the communications device, or
    when the second subset is not empty, passing the unique identifier and the second subset to the device driver, the device driver combining the second subset with the first subset associated with the unique identifier to create a modified set of connections parameters, the combining comprising overwriting the at least one original parameter of the first subset with the at least one changed parameter of the second subset, the device driver using the modified set to connect to the communications network using the communications device.

8. A system for seamlessly updating connection parameters, the system comprising:
    a host machine comprising at least one processor, volatile storage, and persistent storage;
    a communications device operable to communicate with the host machine and capable of connecting to a communication network;
    a device driver that enables communication between the host machine and the communication device as well as calculates a unique identifier for the connection parameters and passes the unique identifier to the host machine and the communications device;
    the volatile storage storing a first subset of the connection parameters and the unique identifier in association with one another;
    the persistent storage storing a second subset of the connection parameters and the unique identifier for the connection parameters in association with one another, the second subset comprising at least one changed parameter created from changes made by a user to at least one original parameter of the first subset;
    a first software module stored in the persistent storage on the host machine that, when executed by the at least one processor, causes the at least one processor to initialize an attempt to connect to the communications network; and
    a second software module stored in the persistent storage on the host machine that, when executed by the at least one process, causes the at least one processor to, when an operator of the communications network updates the connection parameters stored on the communications device with new connection parameters:
    determines whether the new connection parameters are public, where new connection parameters determined to be public are stored in the persistent storage, and where new connection parameters not determined to be public are not stored in the persistent storage.

9. The system of claim 8, wherein the first subset of the connection parameters comprises an Access Point Name, username, and password.

10. The system of claim 9, wherein the first subset of the connection parameters further comprises quality of service and security settings.

11. The system of claim 9, wherein the first subset of the connection parameters further comprises references to memory locations on the communications device from which quality of service and security settings can be retrieved.

12. The system of claim 8, wherein the communications network is a Global System for Mobile Communication network implementing a General Packet Radio Service protocol.

13. The system of claim 8, wherein the first software module causes the at least one processor to initialize the attempt at least in part by:
- when the second subset is empty, passing the unique identifier associated with the second subset to a device driver, the device driver using the first subset that is associated with the unique identifier to connect to the communications network using the communications device, or
- when the second subset is not empty, passing the unique identifier and the second subset to the device driver, the device driver combining the second subset with the first subset associated with the unique identifier to create a modified set of connections parameters, the combining comprising overwriting the at least one original parameter of the first subset with the at least one changed parameter of the second subset, the device driver using the modified set to connect to the communications network using the communications device.

14. The system of claim 8, wherein the communications device comprises one of a PCMCIA card, a PCI card, and a USB device.

15. A tangible computer-readable storage medium comprising computer-readable code instructions that, when executed by at least one processor of a host machine comprising a communications device, cause the host machine to carry out a method comprising:
- copying a first subset of the connection parameters from the communications device to the host machine;
- calculating a unique identifier for the connection parameters;
- storing and associating with one another in volatile memory of the host machine the first subset of the connection parameters and the unique identifier;
- storing and associating with one another in persistent storage of the host machine a second subset of connection parameters and the unique identifier, said second subset comprising at least one changed parameter created from changes made to at least one original parameter of the first subset by a user of the host machine;
- when an operator of the communications network updates the connection parameters stored on the communications device with new connection parameters,
  - determining which of the new connection parameters are public and which of the new connection parameters are private;
  - storing the new connection parameters determined to be public in the persistent storage, and where new connection parameters not determined to be public are not stored in the persistent storaqe.

16. The tangible computer-readable storage medium of claim 15, wherein the first subset of the connection parameters comprises an Access Point Name, username, and password.

17. The tangible computer-readable storage medium of claim 16, wherein the first subset of the connection parameters further comprises quality of service and security settings.

18. The tangible computer-readable storage medium of claim 16, wherein the first subset of the connection parameters further comprises references to memory locations on the communications device from which quality of service and security settings can be retrieved.

19. The tangible computer-readable storage medium of claim 15, wherein the unique identifier comprises an MD5 hash of the connection parameters.

20. The system of claim 8, wherein the device driver comprises the first software module and/or the second software module.

* * * * *